March 16, 1954      R. C. FREVIK      2,672,082
IMPLEMENT HITCH FOR TRACTORS
Filed Aug. 31, 1951
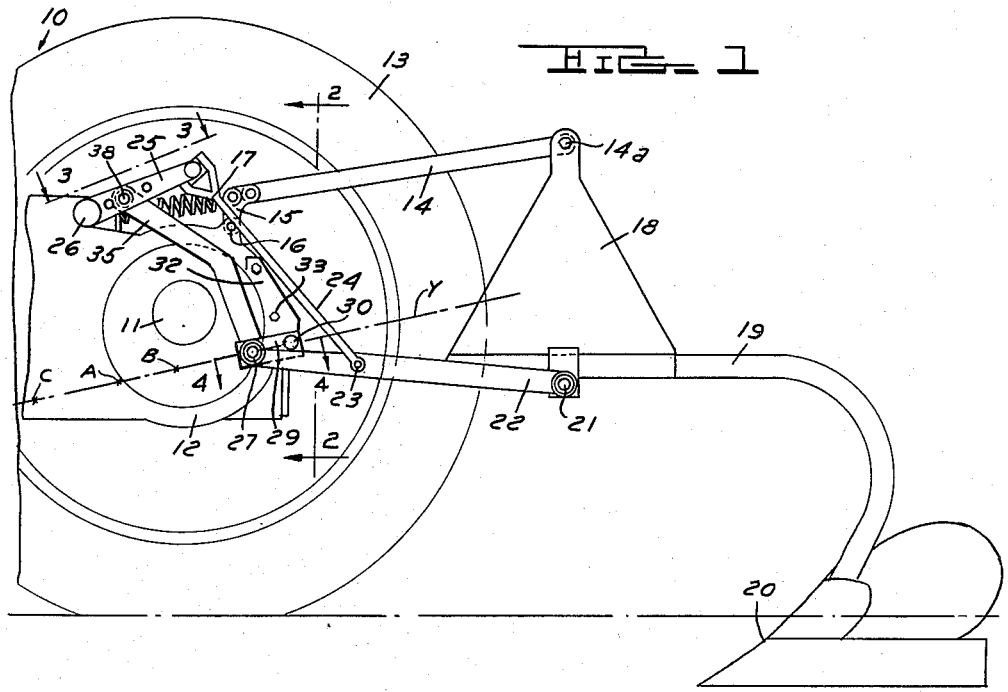
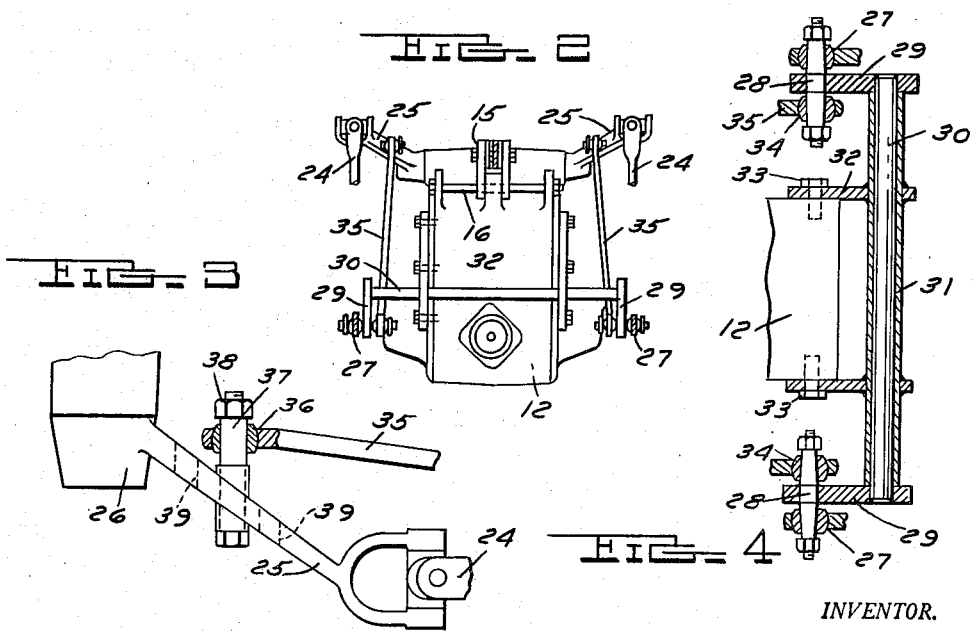
INVENTOR.
RALPH C. FREVIK
BY
*W. A. Schaich*
ATTORNEY

Patented Mar. 16, 1954

2,672,082

UNITED STATES PATENT OFFICE 2,672,082

IMPLEMENT HITCH FOR TRACTORS

Ralph C. Frevik, Detroit, Mich., assignor to Dearborn Motors Corporation, Birmingham, Mich., a corporation of Delaware Application August 31, 1951, Serial No. 244,546

7 Claims. (Cl. 97—47.56)

1

The present invention relates to an implement hitch for tractors, and more particularly to a hitch having a pair of vertically convergent hitch elements for securing an implement to a tractor so that the implement is disposed for vertical movement about an effective pivot point different from its point of actual attachment to the tractor.

It has been proposed that ground-engaging implements, particularly plows, be attached to a tractor through vertically spaced, forwardly convergent upper and lower links. However, the conventional linkage of this type involves the connection of the lower links to the tractor rear axle housing at fixed points resulting in the effective elevation and lowering of the implement about a forwardly located point, so that a plow having an A-frame connected to the links and rigidly carrying the plow shares slightly changes the plow point pitch during elevation and lowering of the plow relative to its working position. This pitching of the share point may be undesirable under extreme operating conditions, since the share point is pitched upwardly as the links are lowered and is pitched downwardly as the links are elevated.

The present invention now provides an improved implement hitch provided with vertically spaced forwardly converging elements, including a top link and laterally spaced lower links. The lower links are connected to power-liftable rock arms by means of a conventional lift arm, and the forward end of one or more of the hitch links is also connected to the power rock arms. The hitch link is thus provided with means for pivoting as a compound lever in accordance with movement of the associated rock arm, and the combined pivoting movement of the rock arm is exerted upon the hitch link at spaced points along the length of the hitch link to obtain an articulated motion about a point forwardly displaced with respect to the hitch link itself. Means are provided for varying the connection point of the forward end of the hitch link to the rock arm, so that the point about which articulated movement occurs may be changed in accordance with the desired plow share point movement.

Thus, it is possible, by use of the present invention, to vary the center about which the share point is effectively moved, so as to vary the share point pitch in accordance with the particular ground conditions under which the plow is being utilized. For example, if difficulty is encountered in causing the plow share point to

2 penetrate the ground, the effective point of hitch link pivoting movement is transferred forwardly of the tractor so that increased penetration is obtained, while rearward shifting of the point of effective link movement is desirable where the plow share suction effect is relatively great, tending to cause the plow to operate at an excessive depth.

It is, therefore, an important object of the present invention to provide a tractor hitch for securing an implement to a tractor for movement about variable effective hitch points to increase the adaptability of the implement to various operating conditions.

Another important object is the provision of an implement hitch for tractors having a pair of forwardly convergent vertically spaced hitch elements, one of the elements being pivotable about an effective pivot point movable longitudinally of the tractor for varying the characteristics of implement movement relative to the tractor.

It is a further object to provide a tractor-implement connection including a power-liftable rock arm on the tractor and a rearwardly extending hitch link having spaced portions pivotally connected to correspondingly spaced portions of the rock arm, so that an articulated arm-link element connection is obtained for pivoting the link element about a forwardly located effective pivot point upon actuation of the rock arm.

Still another important object of the present invention is the provision of an implement hitch for a tractor having a power-liftable rock arm, the hitch including a link element connected intermediate its length to the rock arm and connected adjacent an end thereof to a portion of the rock arm spaced from the point of first connection, whereby an articulated connection of the rock arm to the link element is obtained, so that the link element is effectively pivoted to the tractor for movement about an effective instantaneous pivot center located forwardly of the actual arm-element connection.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a schematic representation of an implement hitch of the present invention as utilized for connecting a plow to the tractor, one of the tractor wheels being removed for clarity;

Figure 2 is a sectional view taken along the plane 2—2 of Figure 1;

Figure 3 is a view taken along th plane 3—3 of Figure 1 with portions broken away and in sections; and Figure 4 is a sectional view, with parts shown in elevation, taken along the plane 4—4 of Figure 1.

As shown on the drawings:

Reference numeral 10 refers generally to a Ford tractor provided with a transversely extending rear axle 11 enclosed within a rear axle housing 12 to support the rear tractor wheels 13 at opposing ends thereof. The tractor 10 is provided with a hydraulic control system including a top link 14 pivotally connected to a top link arm 15 which in turn is pivoted, as at 16, to the rear axle housing 12. As is conventional in this type of tractor, the top link 14 reacts through the arm 15 against a hydraulic control spring 17.

The top link 14 has its free end pivoted, as at 14a, to the upper portion of an A-frame 18 rigidly carried by the beam 19 of a plow, the beam having a plow share 20. The A-frame 18 also carries laterally projecting connecting pins 21 upon which are disposed forwardly extending lower link elements 22. The link elements 22 are pivoted intermediate their length, as at 23, to upwardly extending lift arms 24 for connecting the link elements 22 to power-liftable rock arms 25 disposed upon the tractor 10 for rotation about an axis 26 located above and forwardly of the rear axle housing 12. The rock arms 25 are power energizable by means of the tractor hydraulic system, as is well-known in the art, with energization of the rock arms causing elevation of the lower links 22 and the implement carried thereby.

The forward ends of the link elements 22 are connected, as through a segmental spherical joint 27 to a transversely extending connecting pin 28 (Figure 4) rigidly attached, as by welding, to crank arms 29. The crank arms 29 are welded or otherwise secured to a shaft 30 extending transversely of the tractor generally parallel to the rear axle housing 12, as best shown in Figures 2 and 4. The shaft 30 is rotatably disposed within a pipe section 31 which is rigidly secured to spaced brackets 32 removably connected, as by bolts 33, to the rear axle housing 12. A crank arm 29 is disposed at either end of the shaft 30, and it will be seen that rotation of the shaft 30 is accommodated by the pipe 31 upon pivoting movement of the crank arms 29.

The transverse pins 28 project through the crank arms 29 to receive at their inner ends a segmental spherical bearing 34 carried by an upwardly extending connecting arm 35 adapted for connection to the rock arms 25. More specifically, the connecting arms 35 terminate in segmental spherical bearings 36 receiving therethrough mounting pins 37 carried by the rock arms 25 between the rock arm end housing 26 and the rock arm connection to the lift arms 24. The pins 37 are secured to the rock arms 25 by means of a pair of nuts 38 threadably received by the arm, and the arm is apertured at a plurality of points, as at 39, to accommodate adjustable positioning of the pin 37 therealong.

The operation of the hitch link hereinbefore described will be readily appreciated from the fact that an articulated connection between the lift arms 25 and the link elements 22 is provided.

Upon elevation of the rock arms 25, the lift link 22 is elevated by means of the lift arms 24, but the forward ends of the link elements 22 are also elevated by virtue of the connecting arm 35. A pivoting of the link elements 22 is thus obtained, and this pivoting movement takes place about an effective pivoting point located forwardly of the link element itself. In addition, it will be noted that the link elements 22 and the top link 14 are forwardly converging toward a point located in the vicinity of the tractor front axle, and so that an effective transfer of the plowing forces places additional weight upon the tractor to hold the same to the ground. However, the implement is elevated as though it were being lifted, upon elevation of the rock arms 25, about an effective instantaneous pivot center located forwardly of the link elements 22. More particularly, the implement pivots as though it were being elevated about an instantaneous hitch point located at the point of theoretical vertical convergence of the link elements 22 and the top link 14.

If the connecting arm 35 is secured to the rock arm 25 at the center one of the aligned apertures 39 and the rock arm is in its vertically adjusted position of Figure 1, the effective instantaneous pivot center of the link elements 22 falls at approximately the point A located on the tractor rear axle housing at the forward and lower portions thereof. This location of the effective instantaneous pivot center is desired for general operating conditions, and the vertical movement of the plow share upon elevation or lowering of the hitch links 27 takes place with substantially no resultant tilting of the plow share point.

Under conditions where ground penetration of the plow share point is difficult, as in the breaking of extremely hard ground, the connecting arm 35 is connected to the rock arms 25 in the forwardmost of the series of holes 39 so that the effective instantaneous pivot center of the link element 27 is located at the point B. In this position, tilting of the plow beam 19 and the share 20 upon elevation and lowering of the hitch links is considerably greater than when the instantaneous pivot center is located at the point A hereinbefore described, inasmuch as the effective length of the link 22 has been decreased, and much greater elevation of the hitch link 22 through the lift arm 24 is obtained with reference to the elevation of the forward end of the hitch link through the connecting arm 35. Consequently, greater tilting of the hitch link occurs upon elevation of the rock arms and a much greater change in the pitch of the plow beam and the plow share point upon link elevation results. Of course, there will also be a resultant greater tilting of the share point upwardly upon elevation of the link elements 22, so that faster clearance of the plow share 20 from the ground will occur upon lifting of the plow.

Under other operating conditions, as where difficulty is encountered in retaining the plow in the ground after penetration has been accomplished, the connection point of the connecting arm 35 and the rock arm 25 is preferably shifted rearwardly to the rearmost of the series of apertures 39. It will be seen that in this case the extent of lifting of the lift link 25 by the lift arms 24 and the connecting arms 35 is more closely correlated and the instantaneous pivot center of the arm 22 is located approximately at the point C. The lowering of the instantaneous pivot center C results in lowering the effective hitch point of the plow to the tractor until the same more closely approximates the true line of plow draft, and the plow will seek to find its own level as determined by the suction built into the plow share. This suction will tend to hold the plow in the ground, and no difficulty will be experienced in retaining plowing depth.

It will be seen that the points A, B and C, about which the link element 22 is effectively pivoted at a given vertically adjusted position of the rock arm 25, lie in a single plane longitudinally aligned with the crank arm 29 when the crank arm 29 is in its corresponding position. A change in the vertical inclination of the arm 29, as by changing the length of the connecting arm 35, will cause a corresponding change in the location of the plane, so that the effective pivot points may be elevated or lowered with respect to the tractor and the implement. In this manner, the operator has a very wide range of operational characteristics by virtue of a minimum number of adjustments. Also, it will be appreciated that the effective points A, B, and C are actually instant pivot centers which vary in location as the rock arms 25 are shifted vertically. Although the pivot centers vary, this variation is due to the pivoted motion of the crank arms 29 as the free ends of the arms 29 are moved by the connecting arms 35, and the points A, B, and C always lie along the plane Y as extended forwardly of the arms 29.

Therefore, it will be seen that the present invention provides an articulated connection of the lift links and the energizable rock arms, so that the lift link is adapted for pivoting movement about a point located forwardly thereof, which point may be shifted longitudinally and vertically of the tractor to yield the desired plow operating characteristics of varying operating conditions.

It will, of course, be understood that various details of construction may be varied through a wide range without departing from the principles of this invention and it is, therefore, not the purpose to limit the patent granted hereon otherwise than necessitated by the scope of the appended claims.

I claim:

1. An implement hitch for a tractor having a power-liftable rock arm comprising a draft link adapted to connect the tractor to an implement, a first lift arm connecting said rock arm adjacent one end thereof to said draft link intermediate the length of said draft link, a second lift arm connecting an intermediate portion of said rock arm to an end of said draft link, and a crank arm carrying said draft link at said end thereof for movement in an arcuate path, whereby movement of said draft link upon movement of said rock arm occurs about an instantaneous pivot center located beyond said draft link and in longitudinal alignment with said crank arm.

2. An implement hitch for a tractor having a power-liftable rock arm, comprising a draft link having one end adapted for connection to an implement and another end adapted for arcuate movement about a pivot on said tractor, angularly movable means for pivotally connecting said another end to the tractor to constrain said link for arcuate movement, and a pair of spaced arms connected at spaced points on said rock arm and spaced points on said draft link, respectively, whereby movement of said rock arm will effect corresponding movement of said draft link about an instantaneous pivot center located exteriorly of said draft link and determined by the angular position of said angularly movable means.

3. An implement hitch for a tractor comprising a power-liftable rock arm movable in a vertical plane, a longitudinally extending crank arm pivotable in a vertical plane and having a free end, a trailing draft link movable in a vertical plane and secured adjacent its forward end to the free end of said crank arm, and a pair of longitudinally spaced connecting arms joining correspondingly spaced portions of said rock arm and said draft link, respectively, for vertical co-movement upon power-lifting of said rock arm, movement of said draft link occurring about an instantaneous pivot center located forwardly of the forward end thereof and in alignment with said crank arm.

4. An implement hitch for a tractor having a rear axle housing comprising a vertically movable rock arm surmounting said housing, said rock arm having one end pivoted to said housing and the other end projecting therefrom, a crank arm pivotally mounted on said housing to generally underlie said rock arm and having one free end, a draft link having one end pivoted to the free end of said crank arm for vertical movement and its other end projecting rearwardly therefrom, a first lift arm connecting said one end of said draft link to an intermediate portion of said rock arm, and a second lift arm connecting the other end of said rock arm to an intermediate portion of said draft link, whereby vertical pivoted movement of said rock arm effects corresponding vertical pivoted movement of said draft link about an instantaneous center of movement located forwardly of the one end thereof in longitudinal alignment with said crank arm.

5. An implement hitch for a tractor having a rear axle housing, comprising a pair of laterally spaced power-liftable rock arms each having a forward end pivoted to said housing and a vertically movable rear end extending therefrom, a cross-shaft rotatably disposed on said housing to generally underlie said rock arms, a generally longitudinally extending crank arm at each axial end of said cross shaft, a pair of laterally spaced rearwardly extending draft links each having its forward end pivotally attached to a corresponding one of said crank arms, first connecting arms joining the forward ends of said draft links to intermediate portions of the associated rock arms, and second connecting arms joining intermediate portions of said draft links to the rear ends of said associated rock arms, said first connecting arms being selectively attachable at spaced points on the associated rock arms, whereby said draft links are pivotal relative to the tractor about forwardly located instant pivot centers which are vertically and longitudinally movable during crank arm vertical movement and which are shiftable relative to the tractor upon variation of the attachment points of said first connecting arms to the respective rock arms to vary the instant pivot centers of said draft links.

6. An implement hitch for a tractor having a power-liftable rock arm comprising a draft link substantially vertically aligned with said rock arm and having a free rear end connectable to an implement, and linkage means constituting a crank arm connection of the forward end of said draft link to the tractor and longitudinally spaced lift connections operatively connecting correspondingly spaced portions of said rock arm and said draft link, said crank arm accommodating vertical arcuate movement of the forward end of said draft link as said link is bodily raised and lowered by said lift arm connections, whereby said link elements form an articulated tractor-draft link connection, and said draft link is pivotal about an instantaneous pivot center lying in the longitudinal plane of said crank arm.

7. An implement hitch as in claim 6 wherein said crank arm connection and one of said lift connections are co-axial and the other of said lift connections operatively connects the free end of said rock arm to a medial portion of said draft link.

RALPH C. FREVIK.

References Cited in the file of this patent

UNITED STATES PATENTS

| Number | Name | Date |
| --- | --- | --- |
| 1,687,719 | Ferguson | Oct. 16, 1928 |
| 2,223,002 | Ferguson | Nov. 26, 1940 |
| 2,368,631 | Blalock | Feb. 6, 1945 |
| 2,480,387 | Smith | Aug. 30, 1949 |
| 2,586,919 | Court | Feb. 26, 1952 |